A. HOILAND.
WILD OATS SEPARATOR.
APPLICATION FILED SEPT. 30, 1912.
1,054,549.
Patented Feb. 25, 1913.
2 SHEETS—SHEET 2.
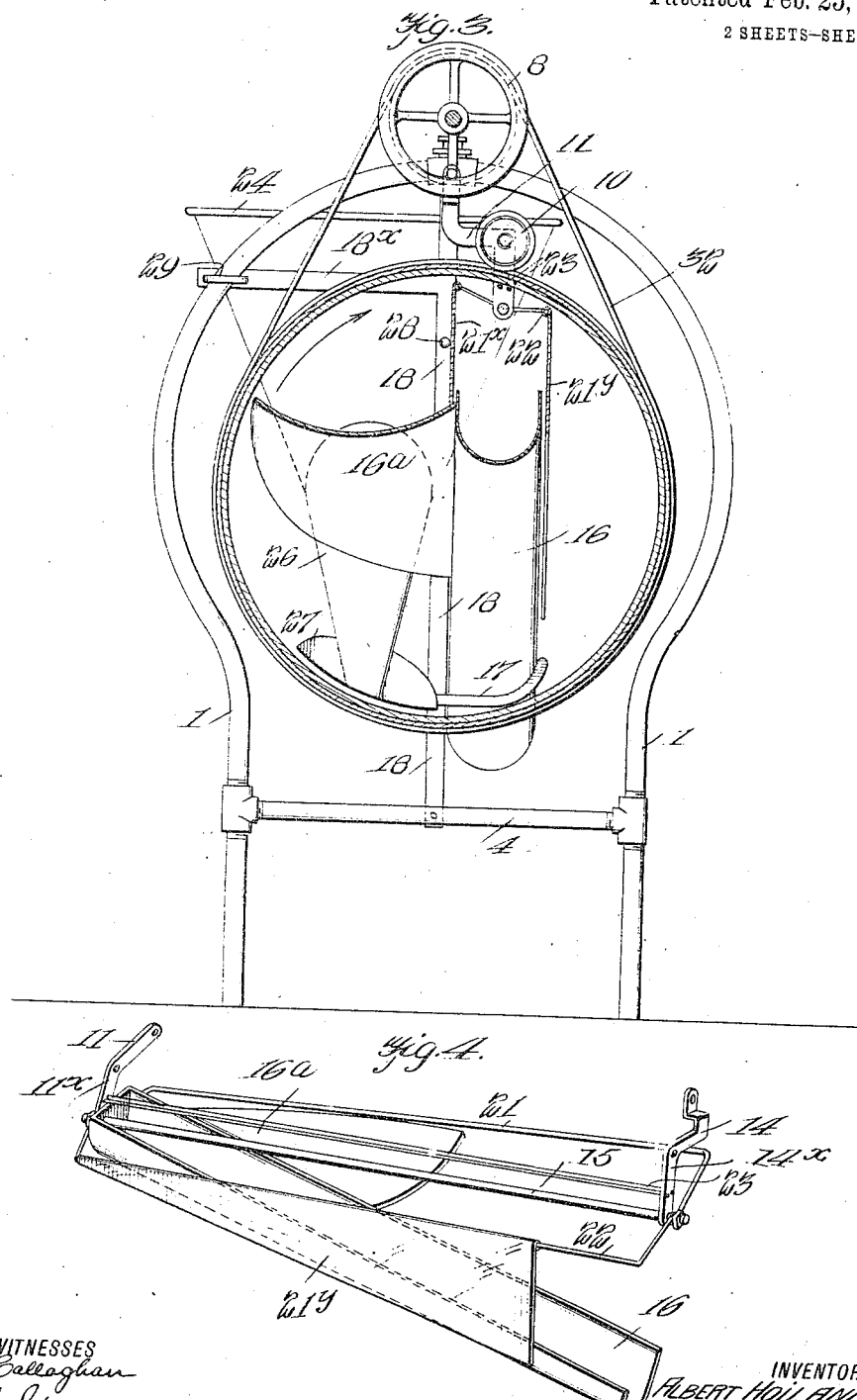

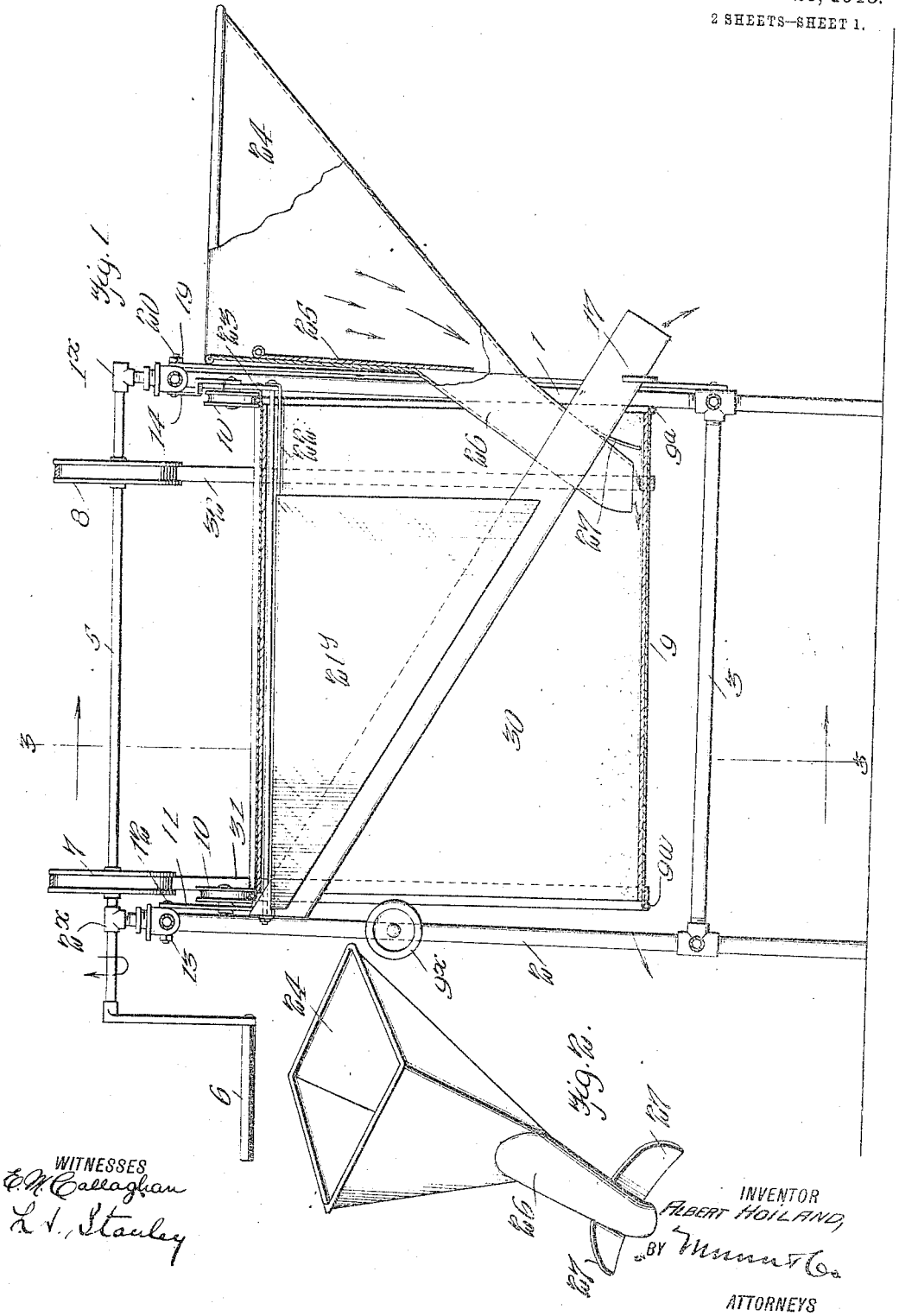

020
UNITED STATES PATENT OFFICE.

ALBERT HOILAND, OF NOME, NORTH DAKOTA.

WILD-OATS SEPARATOR.

1,054,549.  Specification of Letters Patent.  Patented Feb. 25, 1913.

Application filed September 30, 1912. Serial No. 723,092.

*To all whom it may concern:*

Be it known that I, ALBERT HOILAND, a citizen of the United States, and a resident of Nome, in the county of Barnes and State of North Dakota, have made certain new and useful Improvements in Wild-Oats Separators, of which the following is a specification.

My invention relates to improvements in devices for separating wild oats, "quack grass", etc., from cultivated oats, wheat, flax, barley, and other grains and it consists in the combinations, constructions and arrangements herein described and claimed.

An object of my invention is to provide a simple device having a few parts, and consequently not liable to get out of order, which will quickly and effectively separate the wild oats from the cultivated oats, delivering the former at one end of the device, and the latter at the other end.

A further object of my invention is to provide a device which can be operated by hand or by power devices.

Other objects and advantages will appear in the following specification, and the novel features of the invention will be particularly pointed out in the appended claims.

My invention is illustrated in the accompanying drawing forming part of this application in which—

Figure 1 is a longitudinal section through the device, Fig. 2 is a perspective view of the main hopper, Fig. 3 is a section along the line 3—3 of Fig. 1, and Fig. 4 is a perspective view showing the scraping device and the discharge trough or chute.

In carrying out my invention I provide a frame, which consists preferably of end members 1 and 2 respectively, joined together by longitudinal braces 3 and transverse braces 4. The frame is preferably made of pipe, bent into the form shown in the drawings, but may be made of any suitable material and of any suitable shape without departing in the least from the spirit and the scope of the invention.

Disposed at the upper ends of the end members 1 and 2 are bearings $1^x$ and $2^x$ respectively for a shaft 5, which is slightly inclined as shown in the drawing. This shaft has a handle 6 at one end, and is provided with a pair of fixed pulleys 7 and 8.

At 9 I have shown a drum open at both ends and of cylindrical shape, this drum being preferably made of sheet metal, although it may be made of other material such as wood or the like. The drum is provided at its ends with flanges or beads $9^a$ extending outwardly. These beads are arranged to be engaged by idlers 10. One of these idlers is carried by an arm 11, which is secured to the frame by means of a pin 12, which passes through the frame and is provided with a nut 13. The position of the idler 10 may be shifted by unloosening the nut, moving the arm and retightening the nut. At the opposite end of the drum, the arm 14, which bears the idler 10, is also secured to the frame 1. As shown in Fig. 4 the arms 11 and 14 have angular extensions $11^x$ and $14^x$, these extensions being connected by a rod 15. The rod 15 forms a support for one end of a trough 16, which is inclined downwardly, the opposite end of the trough being supported by means of a curved arm 17 secured to a vertical rod 18. The lower end of the rod 18 is secured to the cross member 4 (see Fig. 3) while the upper end is secured to the top of the frame 1, by means of a pin 19, which passes through the arm 14. A nut 20 is provided for regulating the position of the arm 14 in the manner already described in connection with the arm 11. The rod 15 is extended and is arranged to support a rectangular frame of wire or other suitable material having side members 21 and 22 respectively. The side member 21 constitutes a support for a shield or curtain $21^x$, while the side member 22 supports a downwardly extending shield or curtain $21^y$. The trough 16 has projecting from it a laterally extending chute $16^a$. This chute, it will be noticed, is toward the upper end of the trough or chute 16. The arms which support the wire frame also carry two or more wires, which constitute scraping devices as explained later.

A main hopper 24 is provided having a slidable door 25 for regulating the feed of the material. This hopper is provided with a spout 26 to which is attached guard plates 27. The hopper is secured to the upwardly extending member 18 at 28. An integral arm 18^x extends laterally from the member 18. A U-shaped bolt 29 secures both the arm 18^x and the hopper to the frame 1. The inner side of the drum 9 is provided with a cotton flannel lining 30. A belt 31 passes around the drum and over the pulley 7, while a similar belt 32 passes around the other end of the drum and over the pulley 8. A guide pulley 9^x is mounted on the frame 2, and is arranged to engage the edge of the drum 9 for guiding the latter.

From the foregoing description of the various parts of the device the operation thereof may be readily understood. The oats containing the "quack grass", wild oats, etc., is fed into the hopper 24 and passes by the spout 26 into the upper end of the inclined drum. The latter is rotated by means of the handle 6, or by any other suitable means, and the drum 9, which is suspended by the belts 31 and 32, is also rotated by these belts, the drum being guided in its rotation by means of the idlers 10. The cultivated oats will pass through the drum, and will be discharged at the lower end of the latter, but the beards of the sprouting end of the wild oats will cling to the cotton flannel and will cause the wild oats to be carried upwardly above the chute 16 into contact with the scrapers 23. This will scrape the wild oats off, and they will fall into the chute 16, which is of sufficient inclination to cause them to be delivered at the lower end thereof. In case any of the wild oats should fall from the flannel before reaching the scrapers 23 they will be guided by the inclined chute 16 and will be delivered toward the upper end of the drum where they will again be carried up by the beard which clings to the flannel. The device is rotated in the direction shown by the arrow in Fig. 3. There is a tendency for the oats to fall over the side of the chute 16, and in order to prevent this I arrange the shield or guards 21^x and 21^y against which the wild oats may hit, thereby deflecting them into the trough 16. The provision of the guards 27 prevents the oats from passing out of the upper end of the drum.

The arrangement of the idlers 10 and the scrapers 23 I deem an important part of my invention, for it will be apparent that no matter what the movement of the drum is the scrapers 23 will follow it, so as to be always in close contact with the flannel. The adjustment of the arms 11 and 14 also insures the proper working of the device.

In using the separator as described herein, I find that the wild oats are completely separated from the cultivated oats. None of the cultivated oats will cling to the flannel, but will be delivered from the lower end of the drum, while all of the wild oats will eventually be delivered into the chute 16. There is therefore no necessity of running the oats more than once through the device.

My device is exceedingly simple in its nature, it has few parts, and is therefore not liable to easily get out of order, and it accomplishes as perfect separation as do devices of a far more complex and costly nature.

I claim:

1. In a wild oats separator, a rotatable inclined drum open at both ends, means on the interior of the drum for engaging projecting portions of certain of the grains for elevating the latter, a frame, a scraping device carried by said frame and arranged to extend through the drum, an inclined delivery chute disposed beneath said scraping device, and a shield suspended by said frame on each side of said chute.

2. In a wild oats separator, a rotatable inclined drum open at both ends, means on the interior of the drum for engaging projecting portions of certain of the grains for elevating the latter, a frame, a scraping device carried by said frame and arranged to extend through the drum, an inclined delivery chute disposed beneath said scraping device, a shield suspended by said frame on each side of said chute, and an auxiliary chute secured to said first named chute on one side thereof, said auxiliary chute being inclined and terminating short of the upper open end of the drum.

3. In a wild oats separator, an inclined drum open at both ends, a main frame, a pair of adjustable arms carried by said main frame, a rod connecting said adjustable arms, a wire frame carried by said rod, a scraping device carried between the ends of said arms, said scraping device, said rod, and said wire frame being arranged to extend through the drum, a delivery chute disposed beneath the scraping-device, and a shield carried by said wire frame on each side of said delivery chute.

4. In a wild oats separator, a frame, a pair of adjustable arms carried by said frame, a rod connecting said adjustable arms, a scraping device carried between the ends of said arms, a shield carried by said arms on both sides thereof, an inclined drum open at both ends rotatably carried by said frame, said scraping device being arranged to pass through said drum, and an idler carried by each of said adjustable arms and arranged to engage the outer surface of the drum.

5. In a wild oats separator, an inclined drum open at both ends, a main frame, a pair of adjustable arms carried by said main frame, a rod connecting said adjustable arms, a wire frame carried by said rod, a scraping device carried between the ends of said arms, said scraping device, said rod, and said wire frame being arranged to extend through the drum, a delivery chute disposed beneath the scraping device, a shield carried by said wire frame on each side of said delivery chute, and an idler carried by each of said adjustable arms and arranged to engage the outer surface of the drum.

ALBERT HOILAND.

Witnesses:
ALFRED AAMOTH,
P. M. KETTELSON.